United States Patent [19]

Kaldas

[11] Patent Number: 4,507,734
[45] Date of Patent: Mar. 26, 1985

[54] DISPLAY SYSTEM FOR DATA IN DIFFERENT FORMS OF WRITING, SUCH AS THE ARABIC AND LATIN ALPHABETS

[75] Inventor: George A. Kaldas, Villeneuve-Loubet, France

[73] Assignee: Texas Instruments Incorporated, Dallas, Tex.

[21] Appl. No.: 302,018

[22] Filed: Sep. 15, 1981

[30] Foreign Application Priority Data

Sep. 17, 1980 [FR] France ............... 80 20007

[51] Int. Cl.³ .................. G06F 15/38; G06F 15/00; B41J 5/00
[52] U.S. Cl. ..................... 364/419; 400/111; 364/900
[58] Field of Search ........... 364/419, 200, 900; 340/735, 790; 400/111

[56] References Cited

U.S. PATENT DOCUMENTS

| | | | |
|---|---|---|---|
| 3,513,968 | 5/1970 | Hanson | 400/111 |
| 3,938,099 | 2/1976 | Hyder | 400/111 |
| 3,998,310 | 12/1976 | Chaudhry | 400/111 |
| 4,122,533 | 10/1978 | Kubinak | 340/790 |
| 4,124,843 | 11/1978 | Bramson et al. | 340/735 |
| 4,137,425 | 1/1979 | Ferroglio et al. | 178/30 |
| 4,145,570 | 3/1979 | Diab | 400/111 |
| 4,193,119 | 3/1980 | Arase et al. | 340/790 |
| 4,365,315 | 12/1982 | Jamnik | 364/419 |
| 4,373,192 | 2/1983 | Yanagiuchi et al. | 364/419 |
| 4,383,306 | 5/1983 | Morimoto et al. | 364/419 |

Primary Examiner—James D. Thomas
Assistant Examiner—William G. Niessen
Attorney, Agent, or Firm—Thomas G. Devine; Leo N. Heiting; Melvin Sharp

[57] ABSTRACT

A system displays data in a first and second alphabet selectable by the operator, the second alphabet being of the kind in which the characters differ in form according to their position in the context. The system receives data in the form of a sequence of standard binary code bytes representing alpha-numeric characters in the first alphabet, alpha-numeric characters in the second alphabet in which the characters are presented in one of the various forms possible for them in accordance with their position in the context, punctuation marks in the two alphabets, and editing functions. A display unit is connected to a ROM, both controlled by a processing unit wherein the ROM contains all of the characters of the first alphabet and all of the forms of all of the characters of the second alphabet including the form transmitted in the standard binary code and corresponding forms, depending upon their respective positions in the context.

10 Claims, 13 Drawing Figures

| INITIAL | MEDIAL | FINAL | ISOLATED | | INITIAL | MEDIAL | FINAL | ISOLATED | |
|---|---|---|---|---|---|---|---|---|---|
| | | ظ | ط | 17 | | | ل | ا | 1 |
| ـعـ | ـعـ | ـع | ع | 18 | ـبـ | ـبـ | ـب | ب | 2 |
| ـغـ | ـغـ | ـغ | غ | 19 | ـتـ | ـتـ | ـت | ت | 3 |
| ـفـ | ـفـ | ـف | ف | 20 | ـثـ | ـثـ | ـث | ث | 4 |
| ـقـ | ـقـ | ـق | ق | 21 | ـجـ | ـجـ | ـج | ج | 5 |
| كـ | ـكـ | ـك | ك | 22 | ـحـ | ـحـ | ـح | ح | 6 |
| لـ | ـلـ | ـل | ل | 23 | ـخـ | ـخـ | ـخ | خ | 7 |
| مـ | ـمـ | ـم | م | 24 | | | ـد | د | 8 |
| نـ | ـنـ | ـن | ن | 25 | | | ـذ | ذ | 9 |
| هـ | ـهـ | ـه | ه | 26 | | | ـر | ر | 10 |
| | | و | و | 27 | | | ـز | ز | 11 |
| | | ى | ي | 28 | سـ | ـسـ | ـس | س | 12 |
| يـ | ـيـ | ى | ى | 29 | شـ | ـشـ | ـش | ش | 13 |
| | | | | | صـ | ـصـ | ـص | ص | 14 |
| | | | | | ضـ | ـضـ | ـض | ض | 15 |
| | | | | | | | ـط | ط | 16 |

SPECIAL CHARACTES

DISPLAY SYSTEM FOR DATA IN DIFFERENT FORMS OF WRITING, SUCH AS THE ARABIC AND LATIN ALPHABETS

This invention relates to a system for displaying data in the Latin and/or Arabic alphabet or script, alphabet selection being possible at any time in dependence upon input data coming from a data source such as an informatics system or an operator keyboard.

Endeavours have previously been made to enable the processing of data in which data acquisition and data restoration after processing can be carried out using the Arabic alphabet. However, no system has yet been devised which can solve the special problems connected with the Arabic alphabet while remaining compatible with the standards and the design parameters at present conventional in data processing systems using only the Latin alphabet.

The Arabic alphabet contains 29 basic characters plus 10 figure characters, two special characters and punctuation marks which, except for 5 marks, are identical to punctuation marks used with the Latin alphabet. Vowel sounds can also be used but are hardly used at all in modern Arabic script and are neglected in data processing systems.

Most of the characters of the Arabic alphabet have a number of forms which amount at the most to 4 and whose use depends upon the position of the letter in its context. A distinction is accordingly drawn between the isolated, initial, medial and final forms.

FIG. 1 of the accompanying drawings shown all the elements necessary for writing an unmutilated Arabic text and coming as close as possible to calligraphy.

Clearly, it is impossible for such a large number of elements to be positioned conveniently, for instance, on a computer terminal keyboard, unless the number of keys are increased considerably, in which event the introduction of data into a data processing system would be a very lengthy procedure.

A further complicating factor is that in Arabic script some characters have to be linked together in a single word.

The main aim of the previous endeavours referred to was to reduce the number of necessary writing elements as far as possible without detriment to intelligibility. For instance, French Patent Application No. 76 23 430 (U.S. Pat. No. 2,319,491) discloses a system of Arabic writing elements in which to provide the complete set of 117 writing elements (a script or alphabet called O-level Lakhdar which is very similar to modern calligraphy) a set of appendices is used which the user has to select at write-in or which the machine must restore at read-out. All the other systems described in this prior art are incomplete and cannot therefore provide correct and readily intelligible representation of Arabic script.

The fact that the appendices must be selected by the user makes the work of data acquisition complicated and laborious. Also, the person writing-in must be familiar beforehand with the particular writing system concerned.

It is a common procedure in informatics to classify some data in alphabetical order. This step is known as "sorting". This operation becomes very complex and may well become impossible if the characters of a word, whether at the start or in the middle, are given such appendices.

A system of this kind is unsuitable for the various computer languages such as Cobol, Fortran and so on since the appendices do not have any code in these languages. A processing system using this writing system would therefore be incompatible with existing data processing systems and with universal standards such as those coming under the American Standard Code for Information Interchange (ASCII).

Another earlier patent (French Pat. No. 2,241,827; U.S. Pat. No. 3,938,099) proposes a process for reproducing languages using the Arabic alphabet wherein the characters are analysed sequentially to determine what the form is of that part of the character linked with the previous character and that part of the character linked with the following character in the context.

This procedure leads to an extremely complex boolean matrix system of analysis, with an encoding of the characters which is compatible neither with ordinary computer languages nor with commercially available equipment.

Also, it is impossible with the system described in the two earlier patents to make a subsequent correction of a letter in a word (hereinafter called replacement operation), and so errors occurring in a job can be corrected only by doing the job all over again.

It is the object of this invention to provide a system for displaying data in Latin and/or Arabic script, the system being compatible with commercially available data processing facilities and operating on data trains in the standard binary code such as ASCII.

The invention therefore relates to a system of the kind hereinbefore outlined and adapted to receive data presenting in the form of a sequence of standard binary code bytes, the data possibly comprising: (1) alphanumerical characters consisting of Latin characters; (2) a set of alphanumerical Arabic characters in which the characters present in one of their various possible forms dictated by their position in the context; (3) Latin and Arabic punctuation marks and (4) function operations. The system in accordance with the invention comprises a display unit associated with a permanent store storing in addition to the forms of the Latin alphanumerical characters all the forms of all the Arabic alphanumerical characters—i.e., the form transmitted in the standard binary code and a number of other forms which may present an Arabic character in accordance with the position thereof in its context; and a processing unit for sequentially discriminating to which of the two alphabets to be displayed the character represented by each byte of the sequence belongs, the unit also being adapted, in dependence upon such discrimination, to select in the store the form of the character to be displayed, such form being determined, in the case of the Arabic characters, in dependence upon the position of the character in the context, Consequently, the data to be displayed, whether relating to the Arabic or Latin alphabet, can be transmitted in the form of a standard code such as ASCII containing 7 bits and one parity bit per byte, the display system being adapted to prepare from these standardised data the correct alphabet which in the case of Arabic is very similar to calligraphy.

Other features and advantages of the invention will become apparent from the following purely exemplary description given with reference to the accompanying drawings wherein:

FIG. 1 is a table showing all the alphabet characters used in normal calligraphic Arabic script;

FIG. 4 shows an ASCII table used in the program interface of the keyboard;

FIG. 5 is a table showing the interface codes of the display ROM associated with the display unit of the system of FIG. 2;

FIG. 12 is a table of the ASCII code used in the ROM of the print-out facility of FIG. 11.

Figure 2:
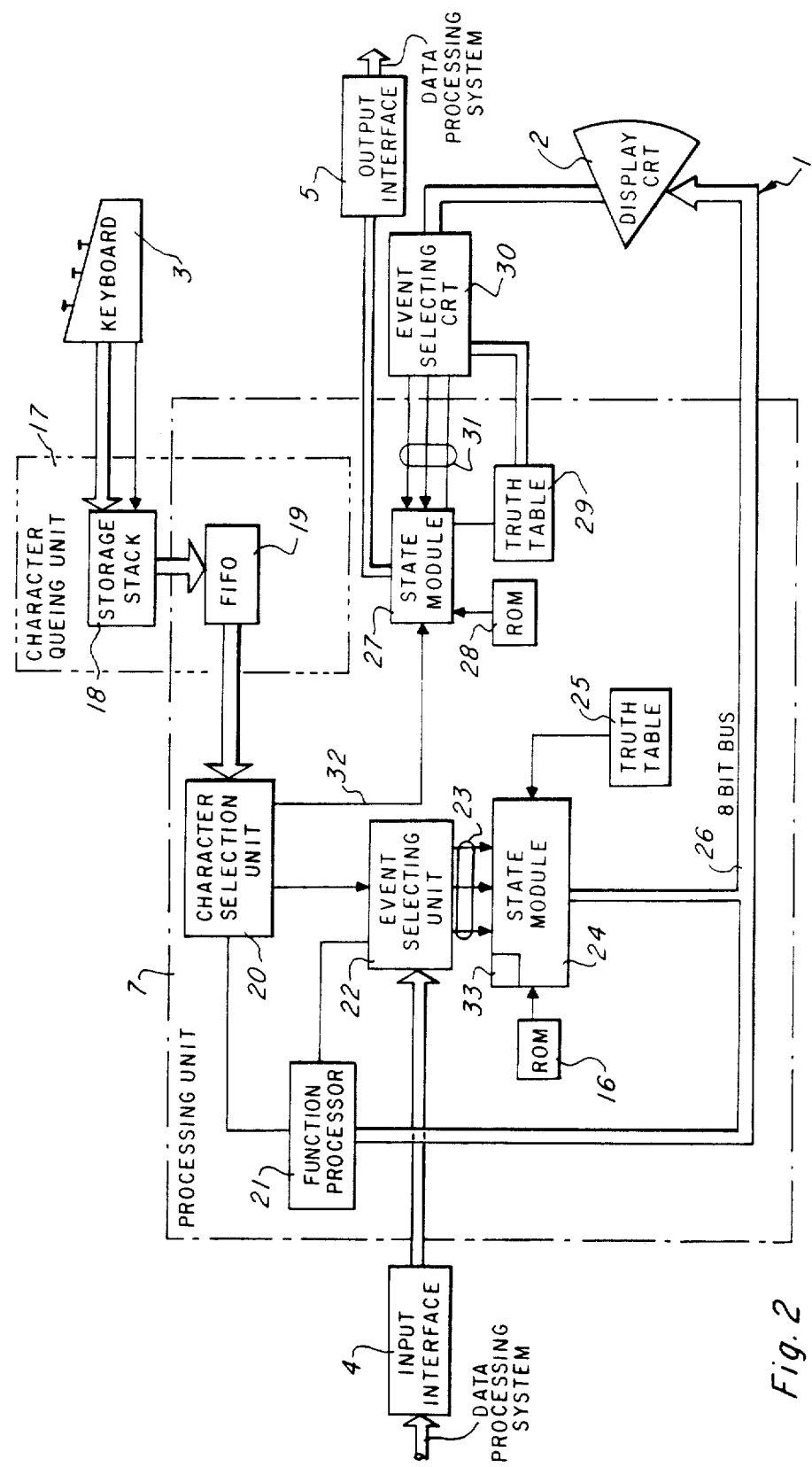
FIG. 2 is a simplified diagram of a display system in accordance with the invention which in the present case is a terminal having a keyboard and a cathode ray tube display screen.

Referring first to FIG. 2, which is the simplified diagrammatic view of a display system 1 in accordance with the invention, the actual display unit of such system is a cathode ray tube display screen 2 arranged with its control circuits in a console (not shown) having a keyboard 3 for the introduction by an operator of data acquisitions. In the case shown it is assumed that the display system 1 is a terminal of a more extensive data processing system (not shown) operating on data flows presenting in a normal standard code such as the ASCII. The display system 1 communicates with the data processing system by way of an input interface 4, for the introduction of a flow of data, and by way of an output interface 5, through which a flow of data, e.g. the data introduced by way of keyboard 3, goes to the data processing system.

As previously stated, correct representation of Arabic script as similar as possible to calligraphy requires a number of signs, the encoding of which would need for each sign or mark bytes too long to be compatible with the standard code such as the ASCII. In this encoding system each byte comprises 7 information bits and 1 parity bit and the number of possible code combinations thus provided would be inadequate to encode all the Latin and Arabic alphanumerical characters (including the four forms necessary for the Arabic alphabet) and the Latin and Arabic punctuation marks.

The invention therefore starts off by reducing the number of Arabic alphanumerical characters so that the set thereof contains only one form for each letter, the numbers and the punctuation marks, so that each character can have its own 8-bit code compatible with the standard code. This principle results from FIG. 4 to which reference may now be made and which shows the table of the ASCII codes used for data introduction and extraction in connection with the display system 1. The table is also used for the keyboard 3 and thus helps to reduce the number of keys thereof to a reasonable amount, thus greatly facilitating data acquisition by the operator. The table in FIG. 4 also represents the codes allotted to the various function operations which are indicated with the usual English terminology universally used in this art.

Figure 4:
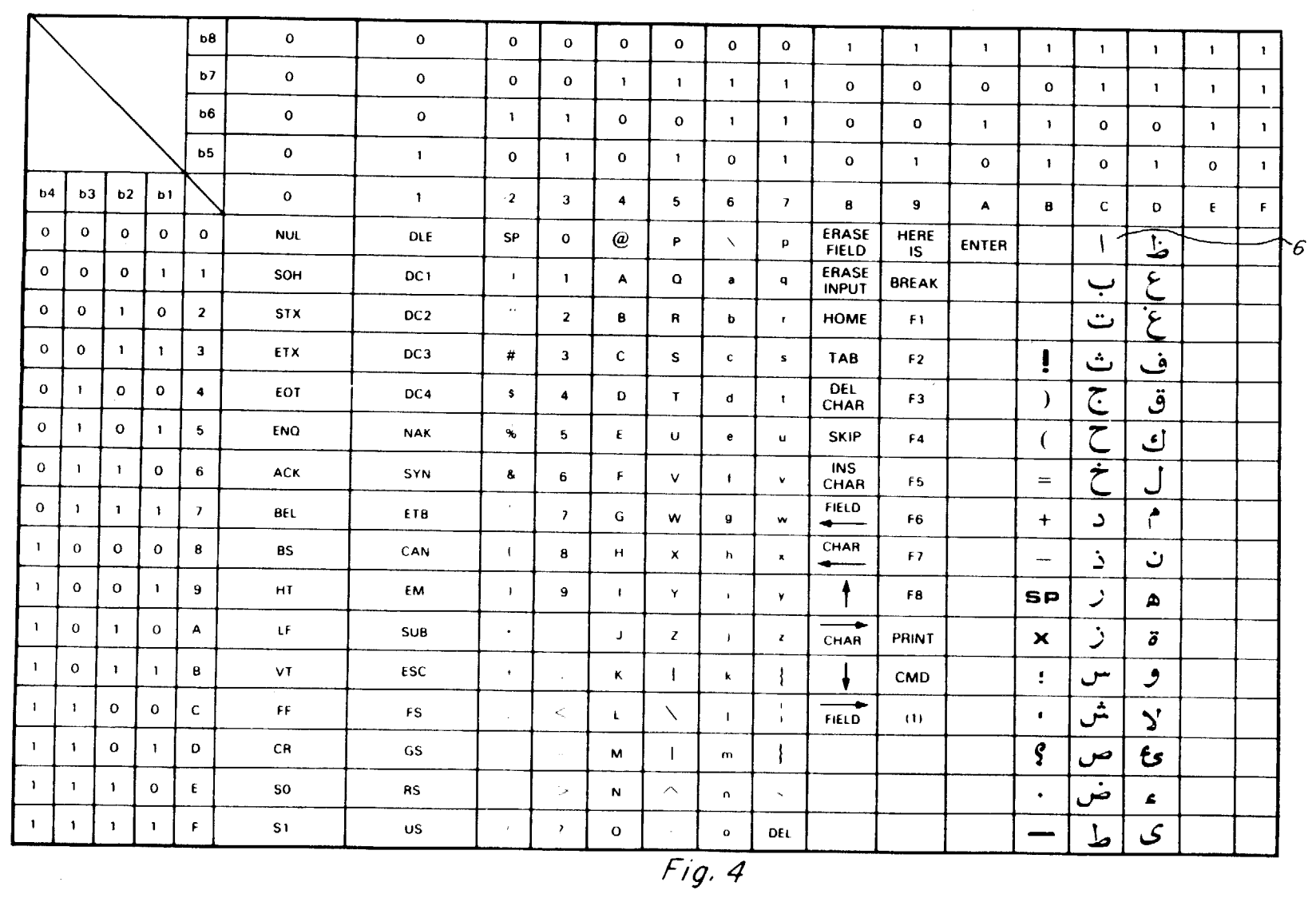

For instance, the table shown in FIG. 4 shows the "alif" (the box denoted by the number 6) is allotted the hexadecimal code OC.

Of course, data transmission in the form just described cannot give correct representation of Arabic writing, and so in accordance with the invention the data are given special processing by way of analysis and control means which form part of the display system 1 of FIG. 2 and which are shown inside rectangle 7 in FIG. 2. The latter means therefore help to provide from a flow of ASCII data the complete Arabic writing in dependence upon a contextual analysis of such data.

Figure 3:
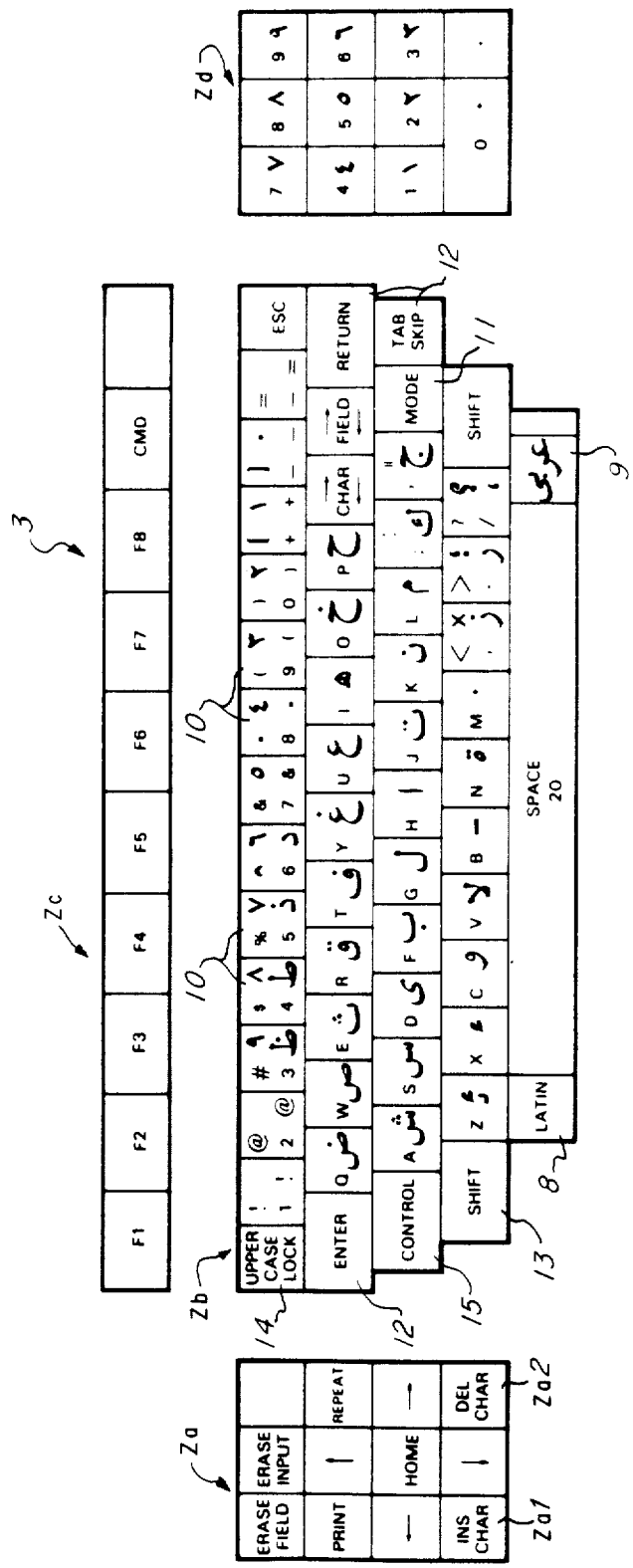
FIG. 3 shows the layout of the keyboard used in the system shown in FIG. 2.

However, before a more detailed description is given of the analysis and control means, reference will first be made to FIG. 3 which is a diagrammatic view of the layout of keyboard 3. The general arrangement thereof is conventional—i.e., it has four zones Za, Zb, Zc, Zd, the zone Za being allotted to control the cursor visible on the display screen by the operator and enabling the operator to locate and identify particular areas of the image field of the screen, the zone Za also comprising some function editing keys. The zone Zb is allotted to the introduction of alphanumerical characters and also has various control keys. The zone Zc has special function keys of use in the data processing system to which the display system 1 is connected, and the zone Zd is allotted to the write-in of figures.

Unlike the conventional keyboards normally used in data processing, the keyboard 3 of the system in accordance with the invention has a Latin mode key, for selecting the Latin alphabet, and an Arabic mode key for selecting the Arabic alphabet, and each of the alphanumerical keys 10 makes it possible to introduce data, according as the key 8 or 9 is selected, either 7-bit Latin character data or 8-bit Arabic character data. The choice of mode can be confirmed by the mode key 11. Function keys, as 12, are marked in English, as is conventional with this kind of keyboard, and so no detailed description of this point will be given here.

Also, the number of Arabic indicia appearing on the keys of the keyboard 3 corresponds to the number given in the corresponding boxes of the Table in FIG. 4.

Table I shows the various character groups obtainable by the keyboard in dependence upon the position of keys 8 and 9, shift key 13, upper case lock key 14 and control key 15.

TABLE I

| Key No. | | | | | |
|---|---|---|---|---|---|
| 13 | 15 | 14 | 8 | 9 | Result |
| NE | NE | NE | E | NE | Lower case Latin |
| NE | NE | E | E | NE | Upper case Latin |
| E | NE | — | E | NE | Latin on right to left |
| NE | NE | — | NE | E | Arabic |
| E | NE | — | NE | E | Arabic on left to right |
| — | E | — | — | — | Control |

In the Table:
NE = not depressed;
E = depressed
— = DON'T CARE.

Keyboard 3 can therefore key in alphanumerical characters classified as follows:

Latin characters: 26 upper-case and 26 lower-case characters and 31 punctuation and special characters, in 7-bit units;

Arabic characters: 32 basic alphabetic characters (one of the forms being selected) and 13 8-bit punctuation and special characters;

Figures—i.e. the 10 figures or digits which are of course used in the same way in both scripts and which both consist of 7 bits; and Controls and functions which are those of the standard ASCII code and which are encoded as 00 to 1F (in hexadecimal code).

A more detailed description will now be given of the processing unit 7 and of the analysis and control means shown in FIG. 2.

So far as analysis of the characters in connection with the alphabet or script to be displayed on the screen 2 is concerned, it is considered that three events may occur during display, as follows:

1. The next element to be displayed is a 7-bit Latin character (letters only);
2. The next element to be displayed is an 8-bit Arabic character (possibly in one of its four possible forms); and
3. The next element to be displayed is a neutral character—i.e. a figure or a special character in Latin or Arabic script (punctuation marks etc) in accordance with the predetermined 7-bit or 8bit ASCII values.

Figure 5:
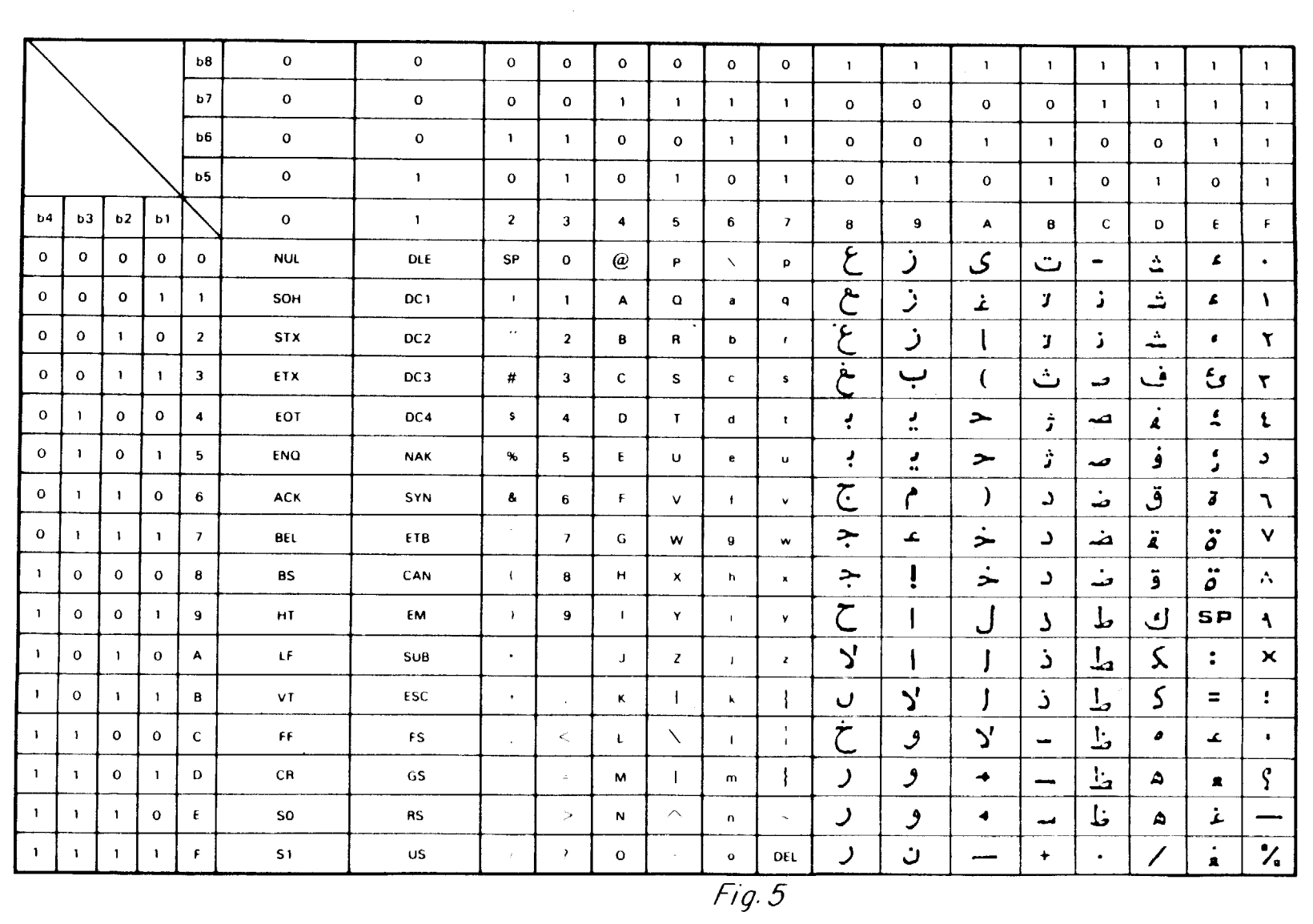

All the characters to be displayed on the screen are stored in a ROM 16 (FIG. 2) and the encoding of these characters is shown in the Table given in FIG. 5; of course, so far as Arabic script is concerned and in accordance with a special feature of the invention, the final and isolated forms of the characters are made identical so that the number of forms per character is limited to three apart from two exceptions—"Ain" and "Ghain" which are stored in their four forms. The isolated and initial forms of these letters have the codes 80, 82 and EC, EE, respectively, in the Table given in FIG. 5.

The keyboard 3 (FIG. 2) is connected to a character-queuing unit 17 comprising the storage stack 18 connected to a first-in first-out unit 19.

The same communicates with a character selection unit 20 which sorts data from the keyboard 3 into pure character data and function data, such as an editing function. The editing data go to a function processor 21 directly connected to screen 2.

The pure character data go to an event-selecting unit 22 (a term used in the sense hereinbefore described) serving to apply to three output lines 23 the signals corresponding to the respective events occurring as the context passes through the display system.

Figure 7:
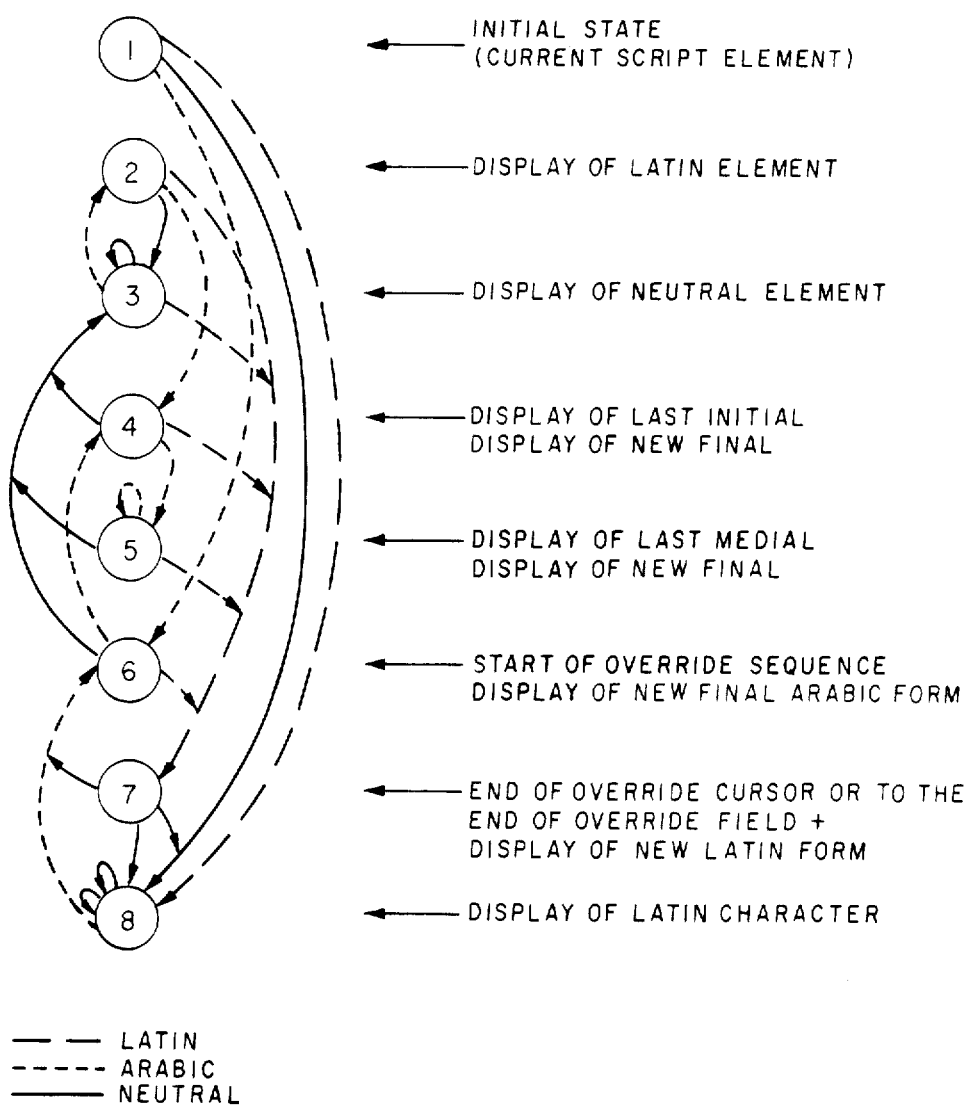
FIGS. 7 to 10 are state diagrams showing the operation of the display system in accordance with the invention.
Figure 8:
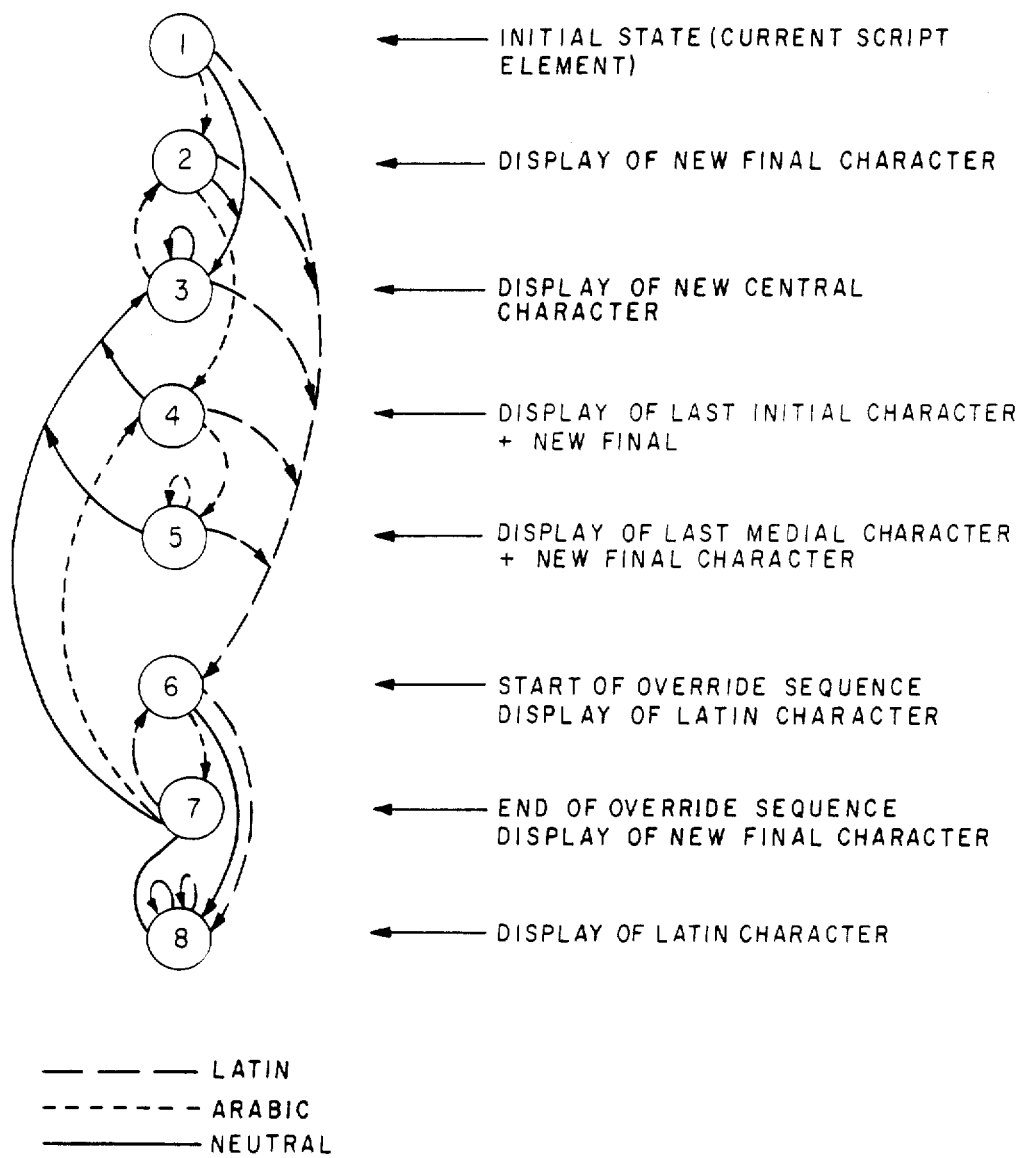

The lines 23 are connected to a state module 24 connected to the ROM 16 providing the set of all the printable characters and also to a module 25 containing the truth table associated with the state module 24. The state module 24 has as its main task to solve the display logistics as arising from the need to represent the characters in Arabic. Accordingly, the character being processed is allocated a value which can be either Latin or Arabic or neutral. Depending on the actual state at the time, the acquired value causes the state module to change over to a different state. Associated with the latter state is a list of instructions relating to the context being processed. FIG. 7 illustrates an example in the Latin mode.

The functions processor 21 is also connected to the event selector unit 22 to make a selection between displaying the editing function and the Latin/Arabic writing operation. The flow of data from the function processor 21 and module 24 are applied by way of an 8-bit bus 26 to screen 2.

Figure 6A:
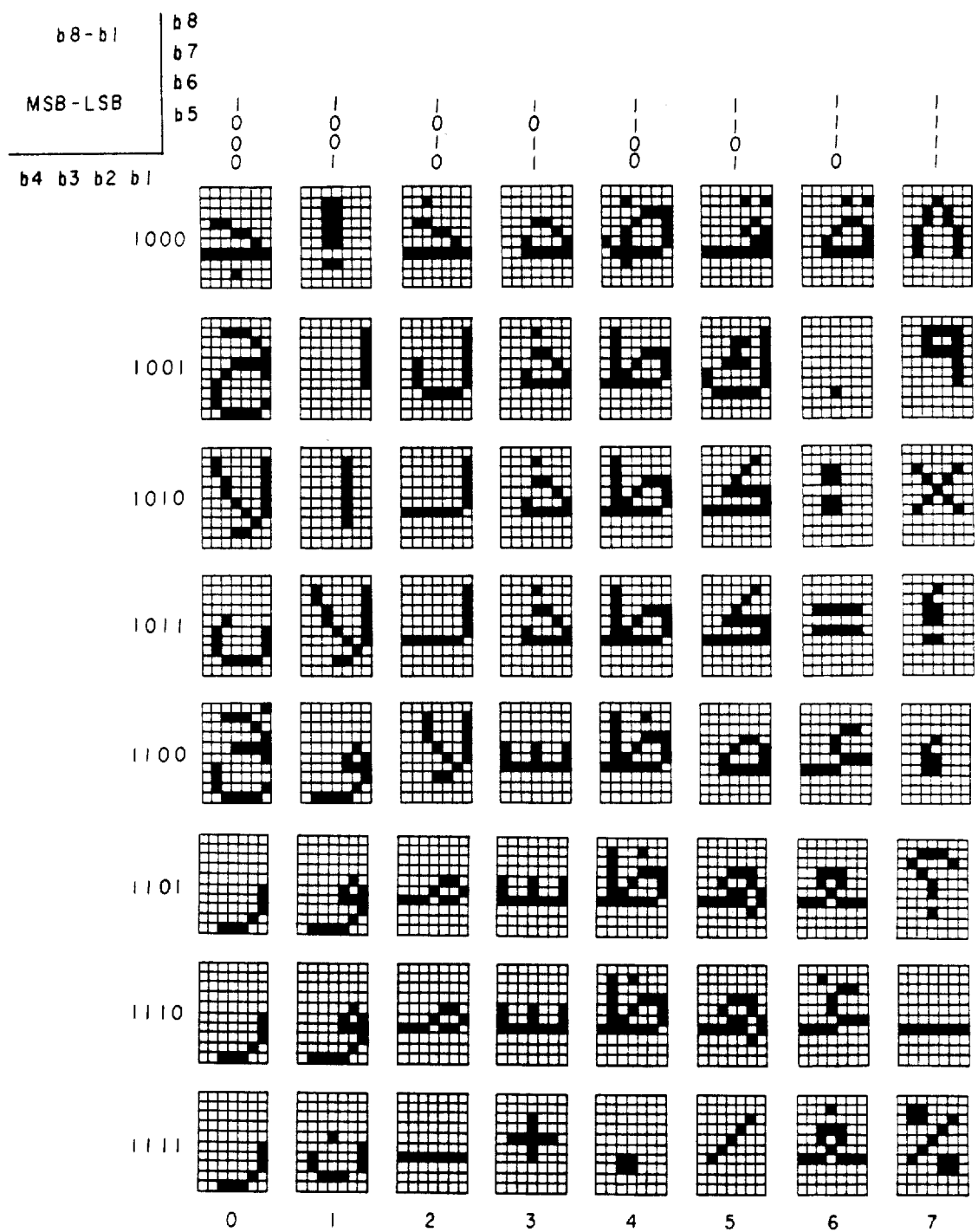
FIGS. 6A and 6B show a set of display matrices relating specifically to Arabic script for the display screen.
Figure 6B:
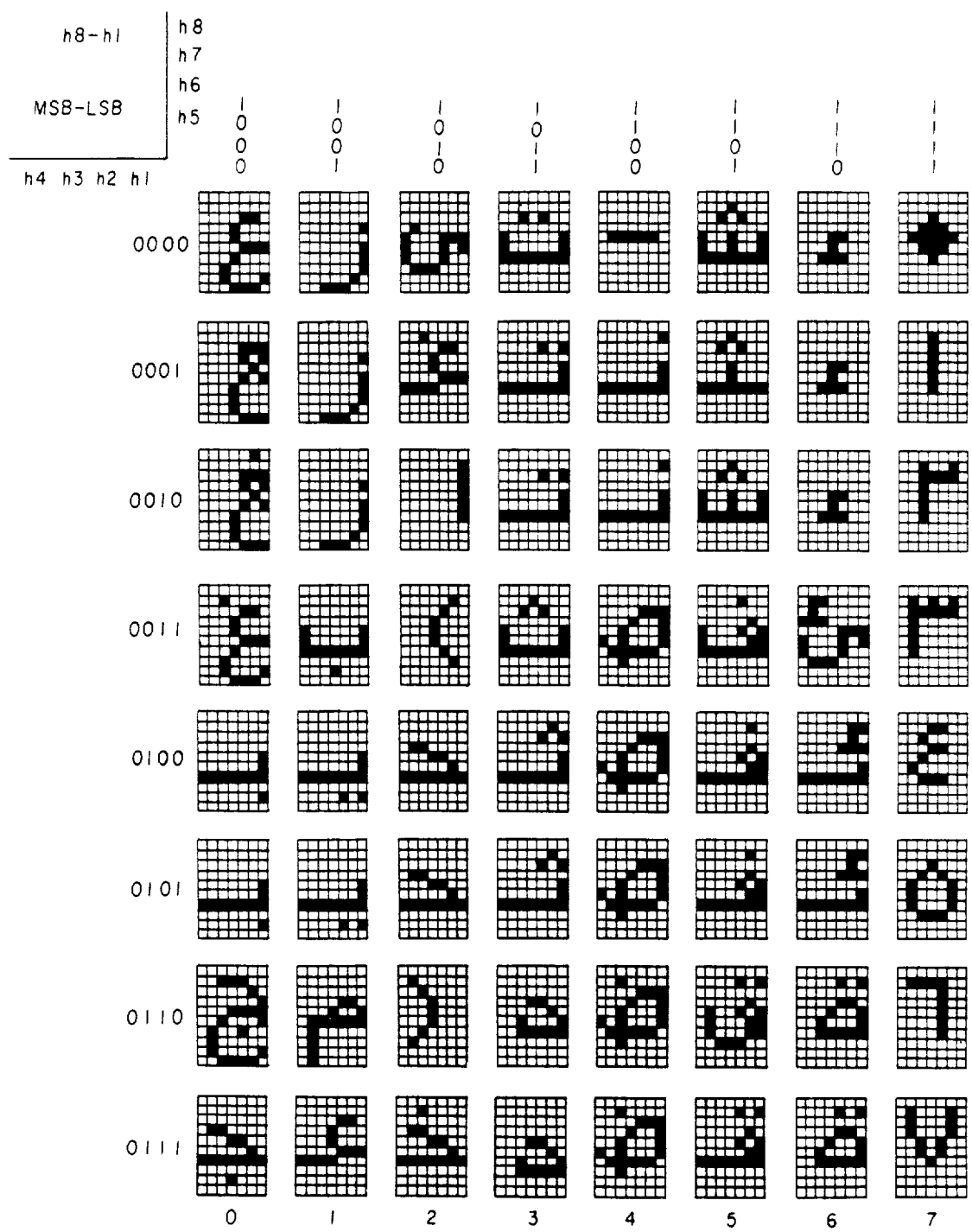

FIGS. 6A and 6B show the display matrices of all the Arabic script indicia used for the display screen.

The term "display screen" used here denotes not only the actual cathode ray tube display screen but all the facilities needed for display and comprising inter alia storage elements; the whole is associated with the output buffer 5. However, the data displayed on the screen and temporarily stored in the storage elements cannot be used in its existing state to be applied to the operator buffer since at the screen the data concerning the Arabic characters still contain data concerning all the forms of the letters, whereas it is precisely at the output buffer 5 that the data have to be condensed into an 8-bit code corresponding to the ASCII code—i.e. the code represented by the Table in FIG. 4.

Consequently, the link between the screen 2 and the output buffer 5 comprises a second state module 27 connected to the screen 2 by way of an event selecting circuit 30 which responds to data from the screen by routing them to three lines 31 representing the three events which can arise in the context as hereinbefore described. The transfer of data between the screen 2 and the output buffer 5 is a gated transfer and occurs only in response to reception of an enabling signal transmitted from a line 32 connected to the character selection unit 20, the latter signal being produced by an enabling key of the keyboard 3.

Figure 9:
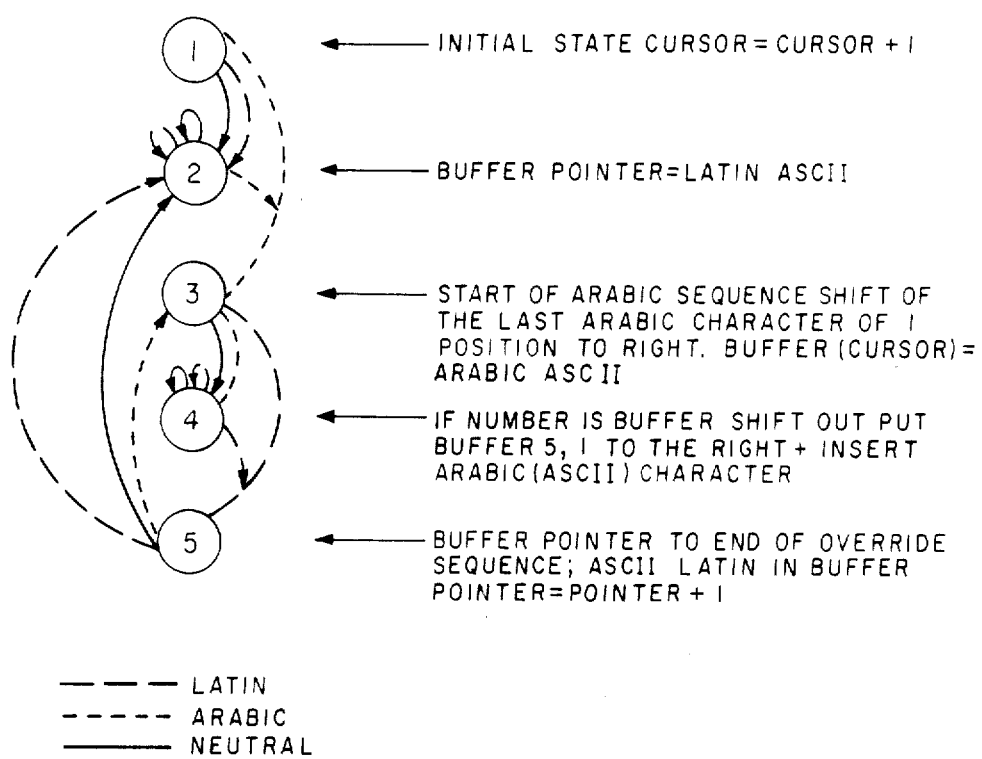
Figure 10:
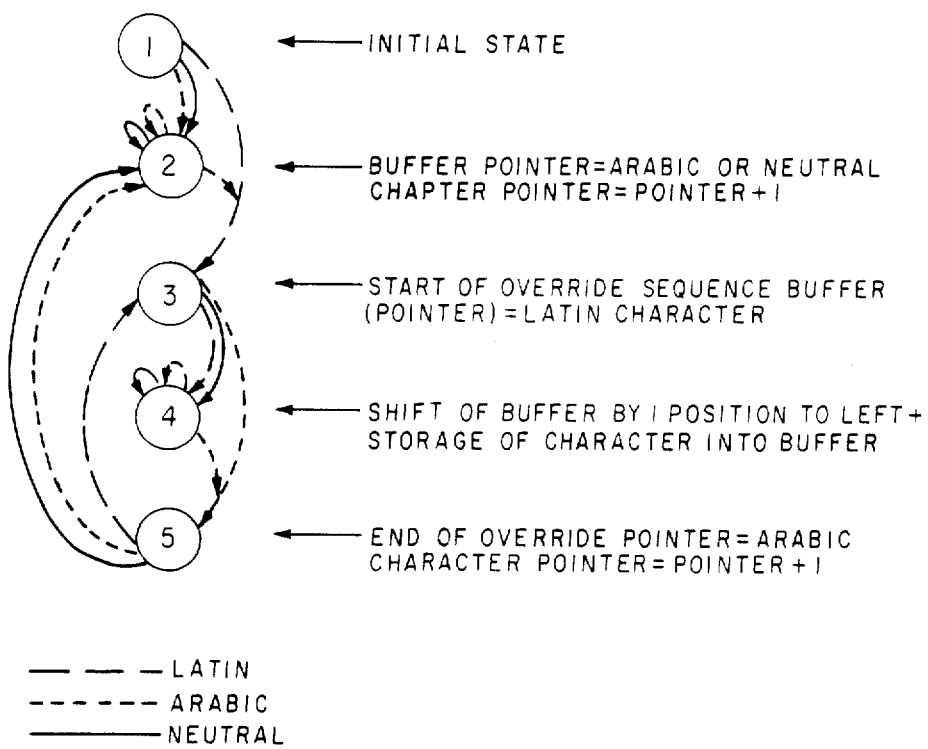

When an enabling character is encountered, the updated part of the screen, which part also serves as memory, is read for updating the user's buffer. Accordingly, the characters of the screen 2 are event-decoded by the circuit 30 and written into the second state module 27. The same is connected to a ROM 28 giving the correspondence between the code of the displayed character and its ASCII value, and to a module 29 containing the truth table associated with the module 27. FIG. 9 shows an example of the line truth table used for the Latin mode read-out of the screen.

The processing of the data to be displayed which occurs in the module 24 by means of the ROM 16 and of the truth table 25 can be summed up in Table II.

TABLE II

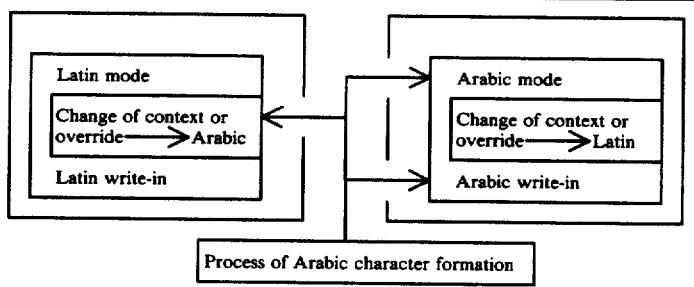

Considering first the Latin mode, the display system 1 writes on the screen 2 from left to right. The starting position of the cursor on the screen is in the top left-hand corner, the text being justified at its left-hand margin. In the Latin mode the Latin or Arabic data can be introduced, e.g. by way of the keyboard 3, in dependence upon the position of the keys as previously described. However, when data concerning the Arabic characters are processed in the Latin mode, the module 24 changes over to an override or change-of-context mode, so that the Arabic is displayed in the opposite direction as compared with the normal direction of writing.

In the Arabic mode the direction of writing is from right to left and the starting position of the cursor is at the top right-hand corner of the screen.

The written text is justified at the right-hand margin. Here too Latin as well as Arabic data can be introduced for function purposes, for instance, keyboard key positions, but in this event the data, if Latin, are processed in a change-of-context mode.

In both the Latin and Arabic modes the direction of writing is produced by instructions as defined in the states of the first state module 24.

Table II shows the three cases in which the Arabic script needs shaping in dependence upon the context.

FIGS. 7 to 10 show four state diagrams explaining operation of the state modules 24, 27 and their respective auxiliary units 16, 25 and 28, 29.

To help in an understanding of these diagrams, a description will be now be given in detail of how the diagram in FIG. 7 is performed, the procedure being shown in Table III by a special sequence example using the Latin mode. The performance of the diagrams of the other Figures can be deduced from this description.

In processing of Arabic data the final (isolated) form is always displayed as an ordinary script element and this form is, if necessary, corrected in dependance upon the context when the next element thereof is displayed.

TABLE III

Example with the following sequence written in by the keyboard using the Latin mode:

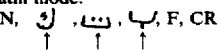

QAF, TA, BA, carriage return

The state diagram of FIG. 7 is used, initial state — 1.

| Character entered | Event | State | Action | Screen image |
|---|---|---|---|---|
|  |  | 1 | Initial state | — ← cursor |
| L | Latin | 8 | Display of L cursor 1 position to right | L_ |
| A | Latin | 8 | Display of A cursor 1 position to right | LA_ |
| T | Latin | 8 | Display of T cursor 1 position to right | LAT_ |
| I | Latin | 8 | Display of T cursor 1 position to right | LATI_ |
| N | Latin | 8 | Display of T cursor 1 position to right | LATIN_ |
| ﻙ | Arabic | 6 | Start override display final mode | LATIN_ |
| ﺐﺗ | Arabic | 4 | Shift by one position to right | LATINﻙ |
|  |  |  | Display initial mode | LATIN_ﺲ |
|  |  |  | Display final mode | LATIN ﺖﺳ |
| ﺑـ | Arabic | 5 | Shift ﺖﺳ by one position to right | LATIN_ﺪ |
|  |  |  | Display, ﺘﺑ medial mode | LATIN_ ﺘﺴﻟ |
|  |  |  | Display ﺑـ final mode | LATIN ﺒﺘﺴﻛ |
| F | Latin | 7 | Shift cursor 1 free position after Arabic field | LATIN ﺒﺘﺴﻛ |
|  |  |  | Display F | LATINﺒﺘﺴﻛF |
|  |  |  | Shift cursor 1 position to right | LATINﺒﺘﺴﻛF |
| Carriage return |  |  | Re-read screen to update buffer |  |

Starting from position 1 of the state diagram—i.e. from the current event being performed at a particular instant of time—if a Latin character is requested, e.g. by the keyboard, there is a change to the state 8 and the character is displayed directly. If an Arabic character is requested the diagram changes to state 6 of the truth table and the final form of the letter is displayed.

This is where the reason for immediately displaying the final form becomes apparent, since if the character is the only character to be requested, its form does not have to be changed at the next event.

If after an event corresponding to a request for a Latin character the process is in state 8 and if a further Latin character is requested, the system loops on state 8 and the further Latin character is displayed.

If a neutral character is requested the system loops on state 8 and the neutral character is also displayed.

If an arabic character is requested after a request for a Latin character, the diagram changes over to state 6, which comes to the same situation as the system changing over from state 1 to state 6.

If the process is in state 6 of the truth table, there are three possible occurrences:

1. A Latin character is requested, in which event the procedure changes over to state 7; this terminates the context-changing sequence and the further Latin character is displayed;

2. A neutral character is requested. The process changes over to state 3 and the neutral character is displayed. However, the override sequence is still unfinished since the neutral character can be within a Latin sequence or an Arabic sequence;

3. An Arabic character is requested. The process changes over to state 4 and the previous character is displayed in its initial form, the further character being displayed in its final form.

If the process is in state 4 and a further Arabic character is requested, the process changes over to state 5 and the previous character is modified to its medial form, the fresh character being displayed in its final form. If further Arabic characters are then requested, the process loops on state 5 until the cessation of requests for Arabic characters.

If the process is in state 5 and a neutral character is requested, the process returns to state 3 and the neutral character is displayed, the override sequence not being started.

If in state 5, a Latin character is requested, the process changes over to state 7, the context-changing sequence is completed and the Latin character is completed.

Consequently this sequence is always completed when a Latin character is requested, for the Latin display mode has been studied in the foregoing.

One of the important features of the invention is the possibility for the operator to correct an Arabic context and to be able to replace any character in such context by a fresh character whose form is appropriate in the light of the position of the former character in the context.

The amendments which the user can make to the context at this level can be of two kinds—immediate or editing.

(1) Immediate amendment: by using the arrows "ZA⟵⟶ ↑ ↓" the user can move the cursor below a character to change it. Replacement is immediate and the following method is used.

The ROM 16 produces a direct correspondence between the code of the displayed character (FIG. 5) and the appropriate form for the character in its context. For each character, therefore, there are three display codes $Z_i$, $Z_j$, $Z_k$ representing the initial, medial and final forms respectively. The code used for the display of $Z_{(i,j,k)}$ is such that $Z_{i/3} = n_1 + (\text{remainder} = 0)$, $Z_{j/3} = n_2 + (\text{remainder} = 1)$, and $Z_{k/3} = n_3 + (\text{remainder} = 2)$.

Because of the allocation of this code, the system in accordance with the invention contains at any time the form of the Arabic characters derived from the display code as a result of a division by 3 of the current byte, corresponding to a remainder of 0 for the initial form, of 1 for the medial form and of 2 for the final form. The remainder therefore identifies each character, and so to replace one Arabic character by another all that needs to be done is to analyse the remainder of the display code of the former character to define its mode and to replace the new character by the same mode.

(2) Editing amendment: If the user wishes to add characters in the context or delete them therefrom, by using the set of arrows ⟵⟶ ↑ ↓, he can position the cursor at the required place and use the key $Za_1$ to insert or add a character or the key $Za_2$ to delete a character.

Insertion: the characters entered from Zb are inserted at the identified place by the position of the cursor until the operation of an enabling key, e.g. a return key, or by using the arrows.

The method used in this case is to return the data on the screen 2 to the state module 24 and to insert in the sequence the character introduced via the keyboard 3.

Deletion: Processing is the same as for insertion except that the action consists of deleting the character defined by cursor position.

Figure 11:
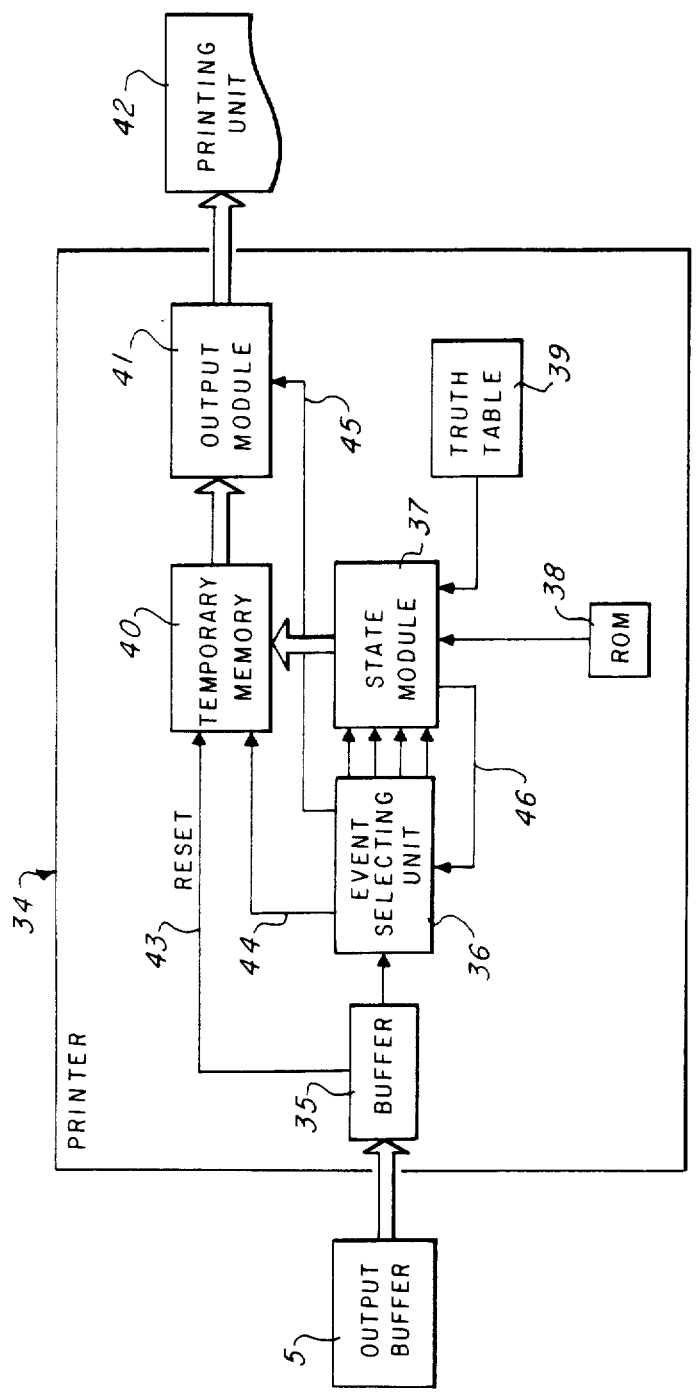
FIG. 11 is a simplified diagram of another display facility which in this case is a print-out facility.

FIG. 11 shows a display device in accordance with the invention which is in this specific case a print-out facility or printer 34. The same is connected to the output buffer 5, e.g. to receive a flow of 8-bit data prepared in accordance with the ASCII code. Buffer 5 is connected to a buffer 35 within the printer 34, the buffer 35 determining a length of the data flow processed at a time in the printer 34 (length of printed lines).

The printer 34 has analysis means for determining the proper forms to be printed in the light of events (consecutive appearance of Arabic and/or Latin characters).

Figure 12:
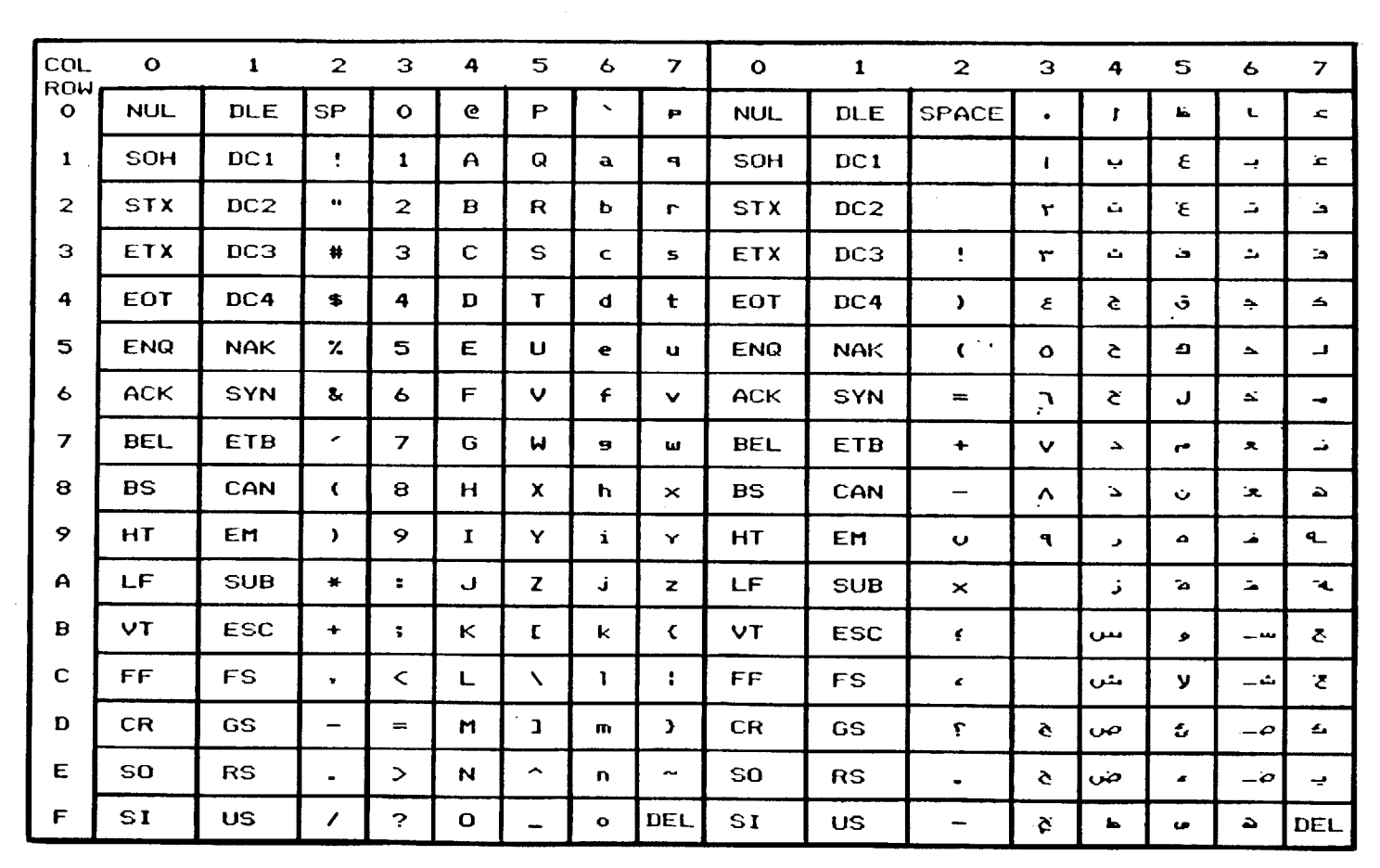

The buffers 35 is therefore connected to an event-selecting unit 36 which is connected to a state module 37, the same being connected to a ROM 38 and to a truth table unit 39. The table of the codes used in ROM 38 is shown in FIG. 12.

The state module sends a flow of 7-bit data to a temporary memory 40 which serves as a buffer and which periodically provides the transmission line by line of the data to an output module 41 which transmits the data to the printing unit 42.

A reset function is transmitted via a line 43 from buffer 35 to the temporary memory 40.

Editing functions detected by the unit 36 can be transmitted to memory 40 via a line 44. An enabling line 45 connects the selection unit 36 to the output module 41 to authorize printing. State module 37 is connected to the unit 36 by a control line 46 providing inter alia a next-character request in the process of analysis of the data flows.

Although the operation of the various analysis elements of the printer 34 is similar to the operation of the corresponding elements of the system shown in FIG. 2, the printer has a number of special features arising from the fact that the data are printed on paper. For instance, as FIG. 4 shows, each Arabic character has a code for its four forms in order that all the forms may be represented to give the most faithful possible representation of the writing or script.

Consequently, ROM 38 has been so devised that a character having a particular programme interface code (in accordance with the ASCII code) corresponds to four printing codes, namely $xy$, $xy + zi$, $xy + zj$, $xy + zk$, in which in hexadecimal code zi can have the value of 60 or 61, zj the value of 60, 61 or 6A and zk the value of 60, 66, or 87. These values are offset by 8 relatively to the programme interface code, and so it becomes possible to use just a single byte to determine the appropriate form of the character to be printed.

The character generator of the printer contains the four forms for each Arabic character (FIG. 12) so ordered in the Table that the four forms all come from the (single) ASCII value and from an offset corresponding to each form. Therefore selection of the form to be printed can be easily and rapidly made since the address is equal to the ASCII code+offset. The Table also contains all the Latin characters. In accordance with the value of the ASCII code there is one of two possibilities:

(a) 7-bit ASCII code: this corresponds to Latin and the character to be printed corresponds directly to the value of the ASCII code;

(b) 8-bit ASCII code: the character is therefore Arabic and a study of the context in the whole of the buffer will determine one of the four forms to be printed for each character of the buffer and therefore the necessary offset to obtain its address in the character generator.

TABLE IV

| Name of character | Code ASCII | ISOLATED Code | ISOLATED Offset | INITIAL Code | INITIAL Offset | MEDIAL Code | MEDIAL Offset | FINAL Code | FINAL Offset |
|---|---|---|---|---|---|---|---|---|---|
| ALIF | C0 | 40 | 80 | 40 | 80 | 60 | 60 | 60 | 60 |
| BA | C1 | 41 | 80 | 61 | 60 | 61 | 60 | 41 | 80 |
| TA | C2 | 42 | 80 | 62 | 60 | 62 | 60 | 42 | 80 |
| THA | C3 | 43 | 80 | 63 | 60 | 63 | 60 | 43 | 80 |
| JIM | C4 | 44 | 80 | 64 | 60 | 64 | 60 | 3D | 87 |
| HA | C5 | 45 | 80 | 65 | 60 | 65 | 60 | 3E | 87 |
| KHA | C6 | 46 | 80 | 66 | 60 | 66 | 60 | 3F | 87 |
| DAL | C7 | 47 | 80 | 47 | 80 | 47 | 80 | 47 | 80 |
| THAL | C8 | 48 | 80 | 48 | 80 | 48 | 80 | 48 | 80 |
| RA | C9 | 49 | 80 | 49 | 80 | 49 | 80 | 49 | 80 |
| ZAYN | CA | 4A | 80 | 4A | 80 | 4A | 80 | 4A | 80 |
| SIN | CB | 4B+29 | 80 | 6B+2F | 60 | 6B+2F | 60 | 4B+29 | 80 |
| CHIN | CC | 4C+29 | 80 | 6C+2F | 60 | 6C+2F | 60 | 4C+29 | 80 |
| SAD | CD | 4D+29 | 80 | 6D+2F | 60 | 6D+2F | 60 | 4D+29 | 80 |
| DAD | CE | 4E+29 | 80 | 6E+2F | 60 | 6E+2F | 60 | 4E+29 | 80 |
| TTA | CF | 4F | 80 | 4F | 80 | 4F | 80 | 4F | 80 |
| ZA | D0 | 50 | 80 | 50 | 80 | 50 | 80 | 50 | 80 |
| AIN | D1 | 51 | 80 | 70 | 61 | 67 | 6A | 7B | 56 |
| GHAIN | D2 | 52 | 80 | 71 | 61 | 68 | 6A | 7C | 56 |
| FA | D3 | 53 | 80 | 72 | 61 | 69 | 6A | 53 | 80 |
| KAF | D4 | 54 | 80 | 73 | 61 | 6A | 6A | 54 | 80 |
| QAF | D5 | 55 | 80 | 74 | 61 | 74 | 61 | 55 | 80 |
| LAM | D6 | 56 | 80 | 75 | 61 | 75 | 61 | 56 | 80 |
| MIM | D7 | 57 | 80 | 76 | 61 | 76 | 61 | 57 | 80 |
| NOUN | D8 | 58 | 80 | 77 | 61 | 77 | 61 | 58 | 80 |
| HA | D9 | 59 | 80 | 78 | 61 | 6F | 6A | 79 | 60 |
| TAMARB | DA | 5A | 80 | 5A | 80 | 5A | 80 | 7A | 60 |
| OUAOU | DB | 5B | 80 | 5B | 80 | 5B | 80 | 5B | 80 |
| LAMALIF | DC | 5C | 80 | 5C | 80 | 5C | 80 | 5C | 80 |
| HAMSAYA | DD | 5D | 80 | 7D | 60 | 7D | 60 | 5D | 80 |
| HAMSA | DE | 5E | 80 | 5E | 80 | 5E | 80 | 5E | 80 |
| YAA | DF | 5F | 80 | 7E | 61 | 7E | 61 | 5F | 80 |
| Zero Arabic | 30 | 30 | 00 | | | | | | |
| 1 Arabic | 31 | 31 | 00 | | | | | | |
| 2 Arabic | 32 | 32 | 00 | | | | | | |
| 3 Arabic | 33 | 33 | 00 | | | | | | |
| 4 Arabic | 34 | 34 | 00 | | | | | | |
| 5 Arabic | 35 | 35 | 00 | | | | | | |
| 6 Arabic | 36 | 36 | 00 | | | | | | |
| 7 Arabic | 37 | 37 | 00 | | | | | | |
| 8 Arabic | 38 | 38 | 00 | | | | | | |
| 9 Arabic | 39 | 39 | 00 | | | | | | |
| ! | B3 | 23 | 90 | | | | | | |
| ) | B4 | 24 | 90 | | | | | | |
| ( | B5 | 25 | 90 | | | | | | |
| = | B6 | 26 | 90 | | | | | | |
| + | B7 | 27 | 90 | | | | | | |
| – | B8 | 28 | 90 | | | | | | |
| Space | B9 | 20 | 99 | | | | | | |
| × | BA | 2A | 90 | | | | | | |
| ﺀ | BB | 2B | 90 | | | | | | |
| ﻉ | BC | 2C | 90 | | | | | | |
| ؟ | BD | 2D | 90 | | | | | | |
| . | BE | 2E | 90 | | | | | | |
| ـ | BF | 2F | 90 | | | | | | |

TABLE V

| Offset | 80 | 56 | 60 | 61 | 6A | 87 | No. of bits |
|---|---|---|---|---|---|---|---|
| INITIAL | 0 | | 1 | 2 | | 2 | 2 |
| MEDIAL | 0 | | 1 | 2 | 3 | | 2 |
| FINAL | 0 | 1 | 2 | | | 3 | 2 |

Two special write-out rules are observed in the printer. After the characters which are normally not contiguous in Arab script (alif, dal, thal, ka, zayn, wau and lamalif), if the character is in the medial form it takes the initial form and if the character is in the final form it takes the isolated form.

The foregoing description relates to a display system for displaying data in Arabic and/or Latin script. However, this invention is not limited to this particular case and extends in general to all scripts or alphabets or the like in which the characters may present in different forms in dependence upon the context.

I claim:

1. A system for displaying data in at least first and second alphabets selectable by the operator, the second alphabet being of the kind in which the characters differ in form according to their position in the context, the system being adapted to receive data in the form of a sequence of standard binary code bytes representing alpha-numeric characters in the first alphabet, alpha-numeric characters in the second alphabet in which the characters are presented in one of the various forms possible for them in accordance with their position in the context, punctuation marks in the two alphabets, and editing functions, comprising:

(a) display means;
 (b) ROM means electrically connected to the display means, for storing, in addition to the forms of the alpha-numeric characters of the first alphabet, all the forms of all the alpha-numeric characters of the second alphabet including the form transmitted in the standard binary code and corresponding forms depending upon their respective positions in the context; and (c) processing means, electrically connected to the display means and to the ROM means for receiving the sequence of standard binary code bytes and for determining to which of the two alphabets to be displayed the character of the byte belongs and to select from the ROM means the form of the character to be displayed, such form being determined, in the case of the second alphabet, in dependence upon the position of the character in the context including as an isolated character, and as a character at the beginning, intermediate position or at the end of a word.

2. A system according to claim 1, wherein the first alphabet is the Latin alphabet and the second alphabet is the Arabic alphabet.

3. A system according to claim 2, wherein the bytes of the sequence are in ASCII code.

4. A system according to claim 3, wherein the processing unit comprises a truth table unit
to which the data to be displayed are applied in the form of three categories of events able to occur during display, such events being the appearance of a character of the first alphabet, the appearance of a character of the second alphabet and the appearance of a "neutral" event related to punctuation marks and the special characters of both alphabets; the truth table determining n states of processing using three inputs representing the events; and the processing unit also comprising a state module adapted to determine, in the light of the current event, the next event to be processed, provided that if such next event is the appearance of a character in the second alphabet, the character displayed after the previous event is given a form in dependence upon the context on the bases of the form codes contained in said ROM.

5. A system according to claim 4, wherein the states of the truth table
comprise an overriding condition for changing over between the two alphabets.

6. A system according to claim 5 wherein the standard binary code form for Arabic represents the character form preceded and followed by a space.

7. A system according to claim 6 comprising a cathode ray display tube; an input buffer for receiving a flow of data from a data-processing system to which it is connected; and an output buffer via which the system is connected to the last-mentioned data-processing system; and the display screen acts as store and is connected to the output buffer by way of a processing unit adapted to convert the displayed data presenting in all the forms of the characters of the second alphabet into a flow of data coded in standard binary code.

8. A system according to claim 7, comprising a keyboard providing data in the standard code and connected to the display screen by way of the processing unit.

9. A system according to claim 6 having a printout facility comprising a printing unit and a standard binary code processing unit, the standard binary code processing unit having an input buffer that is connected to the processing unit.

10. A system according to claim 9, wherein the standard binary code processing unit comprises a state module, a truth table and a ROM having stored therein the codes not only of the characters of the first alphabet but also of the character forms of the second alphabet.

* * * * *